US012799251B2

(12) United States Patent
Koop et al.

(10) Patent No.: US 12,799,251 B2
(45) Date of Patent: Nov. 17, 2026

(54) CHELATE RESINS

(71) Applicant: LANXESS Deutschland GmbH, Cologne (DE)

(72) Inventors: Bernd Koop, Cologne (DE); Dirk Steinhilber, Neuss (DE); Joachim Kralik, Leichlingen (DE)

(73) Assignee: LANXESS Deutschland GmbH, Cologne (DE)

( * ) Notice: Subject to any disclaimer, the term of this patent is extended or adjusted under 35 U.S.C. 154(b) by 737 days.

(21) Appl. No.: 18/028,344

(22) PCT Filed: Sep. 27, 2021

(86) PCT No.: PCT/EP2021/076453

§ 371 (c)(1),
(2) Date: Mar. 24, 2023

(87) PCT Pub. No.: WO2022/069389

PCT Pub. Date: Apr. 7, 2022

(65) Prior Publication Data

US 2023/0374180 A1 Nov. 23, 2023

(30) Foreign Application Priority Data

Sep. 30, 2020 (EP) .................................... 20199195

(51) Int. Cl.

| | |
|---|---|
| ***C08F 230/02*** | (2006.01) |
| ***B01J 45/00*** | (2006.01) |
| ***C08F 8/30*** | (2006.01) |
| ***C08F 8/40*** | (2006.01) |
| ***C08F 212/08*** | (2006.01) |

(52) U.S. Cl.
CPC .................................. *C08F 230/02* (2013.01)

(58) Field of Classification Search
CPC .. C08F 230/02; C08F 8/40; C08F 8/30; C08F 212/08; B01J 45/00
See application file for complete search history.

(56) References Cited

U.S. PATENT DOCUMENTS

| | | | |
|---|---|---|---|
| 4,382,124 | A | 5/1983 | Meitzner et al. |
| 4,419,245 | A | 12/1983 | Barrett et al. |
| 4,427,794 | A | 1/1984 | Lange et al. |
| 4,444,961 | A | 4/1984 | Timm |
| 5,231,115 | A | 7/1993 | Harris |
| 7,077,964 | B2 | 7/2006 | Klipper et al. |
| 7,282,153 | B2 | 10/2007 | Barrett et al. |
| 8,440,730 | B2 | 5/2013 | Klipper et al. |
| 8,562,922 | B2 | 10/2013 | Klipper et al. |

FOREIGN PATENT DOCUMENTS

| | | |
|---|---|---|
| DE | 2848289 A1 | 6/1980 |
| EP | 0481603 A1 | 4/1992 |

OTHER PUBLICATIONS

European Search Report from corresponding European Application No. EP20199195, dated Mar. 17, 2021, two pages.

*Primary Examiner* — Catherine S Branch
(74) *Attorney, Agent, or Firm* — Nicanor A. Kohncke; Christopher L. McDavid; Ewa M. Wozniak

(57) ABSTRACT

The invention relates to chelate resins containing aminoalkylphosphinic acid derivatives, to a process for the preparation thereof, and to their use in the recovery and purification of metals, preferably heavy metals, noble metals and rare earths.

15 Claims, No Drawings

CHELATE RESINS

The present invention relates to chelating resins containing aminoalkylphosphinic acid derivatives, to a process for the preparation thereof, and to the use thereof for the recovery and purification of metals, preferably of heavy metals, noble metals and rare earths.

The development of novel chelating resins continues to be of great importance in the field of research. Said chelating resins can have considerable use potential for the recovery of metals and in the field of water purification. In particular, the removal of zinc from nickel electrolytes for the preparation of battery cathode materials remains a relevant subject.

DE-A 102009047848 and EP-A 1078690 disclose chelating resins containing aminoalkylphosphonic acid groups. DE-A 102009047848 describes in particular the use of these resins for the adsorption of calcium.

DE-A 2848289 describes the preparation of chelating resins containing aminomethylhydroxymethylphosphinic acid groups by reaction of a chloromethylated polystyrene copolymer with a polyamine and the subsequent reaction thereof with formalin and a hypophosphite. These resins are used to remove tungsten ions.

The prior art is disadvantageous in that the zinc capacity of the usable chelating resins is not sufficient. There was therefore still a need for a chelating resin with which zinc is adsorbed in large amounts. It has now surprisingly been found that specific chelating resins containing aminomethylphosphinic acid derivatives are particularly suitable for removing zinc.

The present invention therefore provides a chelating resin containing functional groups of structural element (I)

(I)

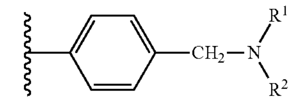

in which ~~~ is the polystyrene copolymer skeleton and $R^1$ and $R^2$ are independently hydrogen or $—CH_2—PO(OR^3)R^4$, where $R^1$ and $R^2$ may not both simultaneously be hydrogen and $R^3$=hydrogen or $C_1$-$C_{15}$ alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, each of which may be mono- or polysubstituted by $C_1$-$C_8$ alkyl.

Preferably, $R^1$ and $R^2$=$—CH_2—PO(OR^3)R^4$.

Preferably, $R^3$=hydrogen and $C_1$-$C_8$ alkyl. Particularly preferably, $R^3$ is methyl, ethyl, n-propyl, isopropyl, n-, i-, s- or t-butyl, cyclopropyl, cyclobutyl, cyclopentyl, n-hexyl, cyclohexyl, n-pentyl and hydrogen. Even further preferably, $R^3$=hydrogen.

Preferably, $R^4$=$C_1$-$C_{15}$ alkyl or $C_6$-$C_{24}$ aryl, which may be mono- or polysubstituted by $C_1$-$C_8$ alkyl. Particularly preferably, $R^4$=$C_1$-$C_6$ alkyl, phenyl and benzyl, which may be substituted by one, two or three $C_1$-$C_8$ alkyl. Very particularly preferably, $R^4$=$C_1$-$C_6$ alkyl and phenyl, which may be mono-, di- or trisubstituted by methyl or ethyl. Even further preferably, $R^4$=ethyl, 2,4,4-trimethylpentyl, 2-methylpentyl, benzyl or phenyl.

In the context of the invention, $C_1$-$C_{15}$ alkyl is a straight-chain, cyclic or branched alkyl radical having 1 to 15 ($C_1$-$C_{15}$), preferably 1 to 12 ($C_1$-$C_{12}$), particularly preferably 1 to 8 ($C_1$-$C_8$) carbon atoms, even further preferably having 1 to 6 ($C_1$-$C_6$) carbon atoms. Preferably, $C_1$-$C_{15}$ alkyl is methyl, ethyl, n-propyl, isopropyl, n-, i-, s- or t-butyl, cyclopropyl, cyclobutyl, cyclopentyl, n-hexyl, cyclohexyl, n-pentyl, 1-methylbutyl, 2-methylbutyl, 3-methylbutyl, 2,2-dimethylpropyl, 1-ethylpropyl, cyclohexyl, 2,4,4-trimethylpentyl and 2-methylpentyl. Particularly preferably, $C_1$-$C_{15}$ alkyl is methyl, ethyl, n-propyl, isopropyl, n-, i-, s- or t-butyl, n-pentyl, n-hexyl, 2,4,4-trimethylpentyl and 2-methylpentyl. Very particularly preferably, $C_1$-$C_{15}$ alkyl or $C_1$-$C_{12}$ alkyl or $C_1$-$C_8$ alkyl or $C_1$-$C_6$ alkyl is ethyl, 2,4,4-trimethylpentyl and 2-methylpentyl.

In the context of the invention, $C_6$-$C_{24}$ aryl is an aromatic radical having 6 to 24 skeleton carbon atoms, in which no, one, two or three skeleton carbon atoms per cycle, but at least one skeleton carbon atom in the entire molecule, may be replaced by heteroatoms selected from the group of nitrogen, sulfur or oxygen, but preferably is a carbocyclic aromatic radical having 6 to 24 skeleton carbon atoms. The same applies to the aromatic part of an arylalkyl radical. Furthermore, the carbocyclic aromatic or heteroaromatic radicals may be substituted by up to five identical or different substituents per cycle, selected from the group: $C_1$-$C_8$ alkyl, $C_2$-$C_{10}$ alkenyl and $C_7$-$C_{15}$ arylalkyl. Preferred $C_6$-$C_{24}$ aryl are phenyl, o-, p-, m-tolyl, naphthyl, phenanthrenyl, anthracenyl or fluorenyl. Preferred heteroaromatic $C_6$-$C_{24}$ aryl in which one, two or three skeleton carbon atoms per cycle, but at least one skeleton carbon atom in the entire molecule, may be replaced by heteroatoms selected from the group of nitrogen, sulfur or oxygen are pyridyl, pyrimidyl, pyridazinyl, pyrazinyl, thienyl, furyl, pyrrolyl, pyrazolyl, imidazolyl, thiazolyl, oxazolyl or isoxazolyl, indolizinyl, indolyl, benzo[b]thienyl, benzo[b]furyl, indazolyl, quinolyl, isoquinolyl, naphthyridinyl, quinazolinyl, benzofuranyl or dibenzofuranyl.

$C_7$-$C_{15}$ arylalkyl in each case means independently a straight-chain, cyclic or branched $C_7$-$C_{15}$ alkyl radical as defined above, which may be mono-, poly- or persubstituted by aryl radicals as defined above. It is preferable when $C_7$-$C_{15}$ arylalkyl=benzyl.

In the context of the invention, $C_2$-$C_{10}$ alkenyl is a straight-chain, cyclic or branched alkenyl radical having 2 to 10 ($C_2$-$C_{10}$), preferably having 2 to 6 ($C_2$-$C_6$), carbon atoms. By way of example and preferably, alkenyl is vinyl, allyl, isopropenyl and n-but-2-en-1-yl.

The scope of the invention encompasses all definitions of radicals, parameters and elucidations above and detailed hereinafter, in general terms or mentioned within preferred ranges, together with one another, i.e. including any combination between the respective ranges and preferred ranges.

Polystyrene copolymers used in the chelating resin containing functional groups of structural element (I) are preferably copolymers of monovinylaromatic monomers selected from the group of styrene, vinyltoluene, ethylstyrene, α-methylstyrene, chlorostyrene or chloromethylstyrene and mixtures of these monomers with polyvinylaromatic compounds (crosslinkers) selected from the group of divinylbenzene, divinyltoluene, trivinylbenzene, divinylnaphthalene and/ortrivinylnaphthalene.

The polystyrene copolymer skeleton used is particularly preferably a styrene/divinylbenzene copolymer. A styrene/divinylbenzene copolymer is a copolymer crosslinked using divinylbenzene. The polymer of the chelating resin preferably has a spherical form.

In the polystyrene copolymer skeleton, the $—CH_2—NR^1R^2$ group is bonded to a phenyl radical.

The chelating resins used in accordance with the invention and containing functional groups of structural element (I) preferably have a macroporous structure.

The terms "microporous" or "in gel form"/"macroporous" have already been described in detail in the technical literature, for example in Seidl, Malinsky, Dusek, Heitz, Adv. Polymer Sci., 1967, Vol. 5, pp. 113 to 213. The possible methods of measurement for macroporosity, for example mercury porosimetry and BET determination, are likewise described in said document. The pores of the macroporous polymers of the chelating resins used in accordance with the invention and containing functional groups of structural element (I) generally and preferably have a diameter of 20 nm to 100 nm.

The chelating resins used in accordance with the invention and containing functional groups of structural element (I) preferably have a monodisperse distribution.

In the present application, monodisperse materials are those in which at least 90% by volume or 90% by mass of the particles have a diameter within the interval of ±10% of the most common diameter.

For example, in the case of a material having a most common diameter of 0.5 mm, at least 90% by volume or 90% by mass is within a size interval between 0.45 mm and 0.55 mm; in the case of a material having a most common diameter of 0.7 mm, at least 90% by volume or 90% by mass is within a size interval between 0.77 mm and 0.63 mm.

The chelating resin containing functional groups of structural element (I) preferably has a diameter of 200 to 1500 μm.

The chelating resins used in the process and containing functional groups of structural element (I) are preferably prepared by:

a) reacting monomer droplets composed of at least one monovinylaromatic compound and at least one polyvinylaromatic compound and at least one initiator,
b) phthalimidomethylating the polymer from step a) with phthalimide or derivatives thereof,
c) reacting the phthalimidomethylated polymer from step b) with at least one acid or at least one base and
d) functionalizing the aminomethylated polymer from step c) by reaction with formaldehyde or derivatives thereof in the presence of at least one suspension medium and at least one acid and at least one compound of formula (II) or salts thereof, (II)

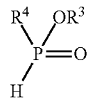

where $R^3$=hydrogen or $C_1$-$C_{15}$ alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, which may be mono- or polysubstituted by $C_1$-$C_8$ alkyl, to form a chelating resin having functional groups of formula (I).

In process step a), at least one monovinylaromatic compound and at least one polyvinylaromatic compound are used. However, it is also possible to use mixtures of two or more monovinylaromatic compounds and mixtures of two or more polyvinylaromatic compounds.

In the context of the present invention, monovinylaromatic compounds used in process step a) are preferably styrene, vinyltoluene, ethylstyrene, α-methylstyrene, chlorostyrene or chloromethylstyrene.

The monovinylaromatic compounds are preferably used in amounts>50% by weight, based on the monomer or the mixture thereof with further monomers, particularly preferably between 55% by weight and 70% by weight based on the monomer or the mixture thereof with further monomers.

Use is especially preferably made of styrene or mixtures of styrene with the aforementioned monomers, preferably with ethylstyrene.

Preferred polyvinylaromatic compounds in the context of the present invention for process step a) are divinylbenzene, divinyltoluene, trivinylbenzene, divinylnaphthalene or trivinylnaphthalene, especially preferably divinylbenzene.

The polyvinylaromatic compounds are preferably used in amounts of 1%-20% by weight, particularly preferably 2%-12% by weight, especially preferably 4%-10% by weight, based on the monomer or the mixture thereof with further monomers. The type of polyvinylaromatic compound (crosslinker) is selected with regard to the later use of the polymer. If divinylbenzene is used, commercial grades of divinylbenzene containing not only the isomers of divinylbenzene but also ethylvinylbenzene are sufficient.

Macroporous polymers are preferably formed by addition of inert materials, preferably at least one porogen, to the monomer mixture in the course of polymerization, in order to produce a macroporous structure in the polymer. Especially preferred porogens are hexane, octane, isooctane, isododecane, pentamethylheptane, methyl ethyl ketone, butanol or octanol and isomers thereof. Especially suitable organic substances are those which dissolve in the monomer but are poor solvents or swellants for the polymer (precipitants for polymers), for example aliphatic hydrocarbons (Farbenfabriken Bayer DBP 1045102, 1957; DBP 1113570, 1957).

U.S. Pat. No. 4,382,124 uses, as porogen, the alcohols having 4 to 10 carbon atoms, which are likewise to be used with preference in the context of the present invention, for the preparation of macroporous polymers based on styrene/divinylbenzene. In addition, an overview of the preparation methods for macroporous polymers is given.

Porogens are preferably used in an amount of 25% by weight to 45% by weight based on the amount of the organic phase.

At least one porogen is preferably added in process step a).

The polymers prepared according to process step a) may be prepared in heterodisperse or monodisperse form.

The preparation of heterodisperse polymers is accomplished by general processes known to those skilled in the art, for example with the aid of suspension polymerization.

Preference is given to preparing monodisperse polymers in process step a).

In a preferred embodiment of the present invention, in process step a), microencapsulated monomer droplets are used in the preparation of monodisperse polymers.

Useful materials for the microencapsulation of the monomer droplets are those known for use as complex coacervates, especially polyesters, natural and synthetic polyamides, polyurethanes or polyureas.

A natural polyamide used is preferably gelatin. This is employed especially as a coacervate and complex coacervate. In the context of the invention, gelatin-containing complex coacervates are particularly understood to mean combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, such as formaldehyde or glutardialdehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to interfacial condensation in which a reactive component (especially an isocyanate or an acid chloride) dissolved in the monomer droplet is reacted with a second reactive component (especially an amine) dissolved in the aqueous phase.

The heterodisperse or optionally microencapsulated, monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds, such as 2,2'-azobis(isobutyronitrile) or 2,2'-azobis(2-methylisobutyronitrle).

The initiators are preferably employed in amounts of 0.05% to 2.5% by weight, particularly preferably 0.1% to 1.5% by weight, based on the monomer mixture.

The optionally monodisperse, microencapsulated monomer droplet may optionally also contain up to 30% by weight (based on the monomer) of crosslinked or uncrosslinked polymer. Preferred polymers derive from the aforementioned monomers, particularly preferably from styrene.

In the preparation of monodisperse polymers in process step a), the aqueous phase, in a further preferred embodiment, may contain a dissolved polymerization inhibitor. Useful inhibitors in this case include both inorganic and organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulfur-containing compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, catechol, tert-butylcatechol, pyrogallol and condensation products of phenols with aldehydes. Further preferred organic inhibitors are nitrogen-containing compounds. Especially preferred are hydroxylamine derivatives such as N,N-diethylhydroxylamine, N-isopropylhydroxylamine and sulfonated or carboxylated N-alkylhydroxylamine or N,N-dialkylhydroxylamine derivatives, hydrazine derivatives such as N,N-hydrazinodiacetic acid, nitroso compounds such as N-nitrosophenylhydroxylamine, N-nitrosophenylhydroxylamine ammonium salt or N-nitrosophenylhydroxylamine aluminum salt. The concentration of the inhibitor is 5-1000 ppm (based on the aqueous phase), preferably 10-500 ppm, particularly preferably 10-250 ppm.

The polymerization of the optionally microencapsulated, monodisperse monomer droplets to give the monodisperse polymer is preferably effected in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The use amount of the protective colloids is generally 0.05% to 1% by weight based on the aqueous phase, preferably 0.05% to 0.5% by weight.

The polymerization to give the monodisperse polymer can, in an alternative preferred embodiment, be conducted in the presence of a buffer system. Preference is given to buffer systems which adjust the pH of the aqueous phase at the start of the polymerization to a value between 14 and 6, preferably between 12 and 8. Under these conditions, protective colloids having carboxylic acid groups are wholly or partly present as salts. This has a favorable effect on the action of the protective colloids. Particularly well-suited buffer systems contain phosphate or borate salts. In the context of the invention, the terms "phosphate" and "borate" also encompass the condensation products of the ortho forms of corresponding acids and salts. The concentration of the phosphate or borate in the aqueous phase is preferably 0.5-500 mmol/l, particularly preferably 2.5-100 mmol/l.

The stirrer speed in the polymerization to give the monodisperse polymer is less critical and, in contrast to conventional polymerization, has no effect on the particle size. Low stirrer speeds sufficient to keep the suspended monomer droplets in suspension and to promote the removal of the heat of polymerization are employed. Various stirrer types can be used for this task. Particularly suitable stirrers are gate stirrers having axial action.

The volume ratio of encapsulated monomer droplets to aqueous phase is preferably 1:0.75 to 1:20, particularly preferably 1:1 to 1:6.

The polymerization temperature to give the monodisperse polymer is guided by the decomposition temperature of the initiator used. It is preferably between 50 °C to 180 C, particularly preferably between 55 °C and 130 °C. The polymerization preferably lasts for 0.5 to about 20 hours. It has proved useful to employ a temperature program in which the polymerization is commenced at low temperature, preferably 60 °C, and the reaction temperature is raised as the polymerization conversion progresses. In this way, for example, the requirement for reliable running of the reaction and high polymerization conversion can be fulfilled very efficiently. After the polymerization, the monodisperse polymer is isolated by conventional methods, for example by filtering or decanting, and optionally washed.

The preparation of the monodisperse polymers with the aid of the jetting principle or the seed-feed principle is known from the prior art and described, for example, in US-A 4 444 961, EP-A 0 046 535, U.S. Pat. No. 4,419,245 or WO 93/12167.

The monodisperse polymers are preferably prepared with the aid of the jetting principle or the seed-feed principle.

A macroporous, monodisperse polymer is preferably prepared in process step a).

In process step b), preference is given to first preparing the amidomethylation reagent. To this end, a phthalimide or a phthalimide derivative is preferably dissolved in a solvent and admixed with formaldehyde or derivatives thereof. A bis(phthalimido) ether is subsequently formed therefrom, with elimination of water. Preferred phthalimide derivatives in the context of the present invention are phthalimide itself or substituted phthalimides, such as preferably methylphthalimide. Derivatives of formaldehyde in the context of the invention also include, by way of example and preferably, aqueous solutions of formaldehyde. An aqueous solution of formaldehyde is preferably formalin. Formalin is preferably a solution of formaldehyde in water. Preferred derivatives of formaldehyde are formalin or paraformaldehyde. It would therefore also be possible in process step b)

to react the phthalimide derivative or the phthalimide with the polymer from step a) in the presence of paraformaldehyde.

The molar ratio of the phthalimide derivatives to the aromatic groups contained in the polymer in process step b) is generally 0.15:1 to 1.7:1, it also being possible to select other molar ratios. The phthalimide derivative is preferably used in a molar ratio of 0.7:1 to 1.45:1 with respect to the aromatic groups contained in the polymer in process step b).

Formaldehyde or derivatives thereof are typically used in excess based on the phthalimide derivative, but it is also possible to use different amounts. Preference is given to using 1.01 to 1.2 mol of formaldehyde or derivatives thereof per mole of phthalimide derivative.

Inert solvents suitable for swelling the polymer, preferably chlorinated hydrocarbons, particularly preferably dichloroethane or methylene chloride, are generally used in process step b). However, processes that are conductable without the use of solvents are also conceivable.

In process step b), the polymer is condensed with phthalimide or derivatives thereof and formaldehyde. The catalyst used here is preferably oleum, sulfuric acid or sulfur trioxide, in order to prepare therefrom an $SO_3$ adduct of the phthalimide derivative in the inert solvent. In process step b), the catalyst is typically added in deficiency with respect to the phthalimide derivative, although it is also possible to use larger amounts. Preferably, the molar ratio of the catalyst to the phthalimide derivatives is 0.1:1 to 0.45:1. Particularly preferably, the molar ratio of the catalyst to the phthalimide derivatives is 0.2:1 to 0.4:1.

Process step b) is conducted at temperatures of preferably 20 °C to 120 °C, particularly preferably of 60 °C to 90 °C.

The cleavage of the phthalic acid radical and thus the liberation of the aminomethyl group is effected in process step c) through treatment with at least one base or at least one acid.

Bases used in process step c) are preferably alkali metal hydroxides, alkaline earth metal hydroxides, ammonia or hydrazine. Acids used in process step c) are preferably nitric acid, phosphoric acid, sulfuric acid, hydrochloric acid, sulfurous acid or nitrous acid. Preferably, use is made in process step c) of at least one base for the cleavage of the phthalic acid radical and thus for the liberation of the aminomethyl group.

Particularly preferably, the cleavage of the phthalic acid radical and thus the liberation of the aminomethyl group is effected in process step c) by treating the phthalimidomethylated polymer with aqueous or alcoholic solutions of an alkali metal hydroxide, such as preferably sodium hydroxide or potassium hydroxide, at temperatures of 100 °C and 250 °C, preferably of 120 °C to 190 °C. The concentration of the sodium hydroxide solution is preferably 20% by weight to 40% by weight based on the aqueous phase. This process makes it possible to prepare aminoalkyl group-containing polymers, preferably an aminomethyl group-containing polymer.

The aminomethylated polymer is generally washed with demineralized water until free from alkali metal. However, it may also be used without aftertreatment.

The process described in steps a) to c) is known as the phthalimide process. Besides the phthalimide process, there is also the option of preparing an aminomethylated polymer with the aid of the chloromethylation process. According to the chloromethylation process, described for example in EP-A 1 568 660, polymers—usually based on styrene/divinylbenzene—are first prepared, chloromethylated and subsequently reacted with amines (Helfferich, lonenaustauscher [ion Exchangers], pages 46-58, Verlag Chemie, Weinheim, 1959) and EP-A 0 481 603). The ion exchanger containing chelating resin having functional groups of formula (I) may be prepared by the phthalimide process or by the chloromethylation process. The ion exchanger according to the invention is preferably prepared by the phthalimide process, according to process steps a) to c), and is then functionalized to give the chelating resin according to step d).

The reaction of the aminomethyl group-containing polymers obtained in process step c) to give the chelating resins containing functional groups of structural element (I) is effected in process step d) with formaldehyde or derivatives thereof in the presence of at least one suspension medium and at least one acid, in combination with at least one compound of formula (II) or salts thereof

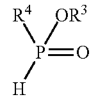

(II)

where $R^3$=hydrogen or $C_1$-$C_{15}$ alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, which may optionally be polysubstituted by $C_1$-$C_8$ alkyl.

The formaldehyde or derivatives thereof used in process step d) are preferably formaldehyde, formalin or paraformaldehyde. Formalin is particularly preferably used in process step d).

Compounds of formula (II) used in process step d) are preferably phenylphosphinic acid, 2,4,4-trimethylpentylphosphinic acid, ethylphosphinic acid or 2-methylpentylphosphinic acid or mixtures of these compounds. The compounds of formula (II) may be used in process step d) also in the salt form. Salts used are preferably the sodium, potassium or lithium salts.

The compounds of formula (II) are commercially available or can be prepared by processes known to those skilled in the art.

The reaction is effected in process step d) in a suspension medium. The suspension medium used is water or alcohols, or mixtures of these solvents. Alcohols used are preferably methanol, ethanol or propanol. Acids used are preferably inorganic acids. Alternatively, organic acids may be used. Inorganic acids used are preferably hydrochloric acid, nitric acid, phosphoric acid or sulfuric acid or mixtures of these acids. The inorganic acids are preferably used in concentrations of 10% to 90% by weight, particularly preferably of 40% to 80% by weight.

In process step d), preference is given to using 1 to 4 mol of the compound of formula (II) per mole of aminomethyl groups of the aminomethylated polymer from process step c).

In process step d), preference is given to using 2 to 8 mol of formaldehyde per mole of aminomethyl groups of the aminomethylated polymer from process step c).

In process step d), preference is given to using 2 to 12 mol of inorganic acid per mole of aminomethyl groups of the aminomethylated polymer from process step c).

The reaction of the aminomethyl group-containing polymer to give chelating resins containing functional groups of structural element (I) in process step d) is preferably effected at temperatures in the range from 70 °C to 120 °C, particularly preferably at temperatures in the range between 85 °C and 110 °C.

In one embodiment of the invention, process step d) may be effected such that the aminomethylated polymer and the compound of formula (II) are initially charged in water. Formaldehyde or derivatives thereof are then added, preferably with stirring. The inorganic acid is then added. Heating to reaction temperature is subsequently performed. After completion of the reaction, the reaction mixture is cooled, the liquid phase is separated off and the resin is preferably washed with demineralized water.

In a further embodiment of the invention, process step d) may be effected such that the aminomethylated polymer, the compound of formula (II) and formaldehyde or derivatives thereof are initially charged in water and the inorganic acids are subsequently added at the reaction temperature. After completion of the reaction, the reaction mixture is cooled, the liquid phase is separated off and the resin is preferably washed with demineralized water.

In a further embodiment of the invention, process step d) involves initially charging the aminomethylated polymer, the inorganic acid and formaldehyde or derivatives thereof in water and subsequently, at the reaction temperature, adding the compound of formula (II). After completion of the reaction, the reaction mixture is cooled, the liquid phase is separated off and the resin is preferably washed with demineralized water.

In a further embodiment of the invention, process step d) involves initially charging the aminomethylated polymer, the compound of formula (II), formaldehyde or derivatives thereof and the inorganic acid in water and subsequently heating to reaction temperature. After completion of the reaction, the reaction mixture is cooled, the liquid phase is separated off and the resin is preferably washed with demineralized water.

Preferably, in all embodiments of the invention, the reaction mixture is stirred for about 3 to 15 hours at the reaction temperature. Optionally, it is also possible to convert the resin prepared in process step d) into the salt form. This may preferably be effected by reaction with alkali metal hydroxides. Alkali metal hydroxides used are particularly preferably sodium hydroxide, potassium hydroxide or lithium hydroxide and the corresponding aqueous solutions.

In a preferred embodiment of the invention, in process step d), the aminomethylated polymer is suspended in water. The compound of formula (II) and the inorganic acids are added to this suspension. The reaction mixture obtained in this way is heated to the reaction temperature and slowly admixed, with stirring, with formaldehyde or derivatives thereof at this temperature. After the addition of the formaldehyde or derivatives thereof has ended, stirring of the reaction mixture is continued for about 3 to 15 hours at the reaction temperature. Subsequently, the reaction mixture is cooled, the liquid phase is separated off and the resin is washed with demineralized water.

The average degree of substitution of the chelating resin according to the invention may be between 0 and 2. The average degree of substitution indicates the statistical molar ratio between unsubstituted, monosubstituted and disubstituted aminomethyl groups in the resin. At a degree of substitution of 0, no substitution would have taken place and the aminomethyl groups of structural element (I) would be present as primary amino groups in the resin. At a degree of substitution of 2, all amino groups in the resin would be present in disubstituted form. At a degree of substitution of 1, all amino groups in the chelating resin according to the invention would be present in monosubstituted form from a statistical viewpoint.

The average degree of substitution of the aminomethyl groups of the chelating resin according to the invention containing functional groups of structural element (I) is preferably 0.5 to 2.0. Particularly preferably, the average degree of substitution of the amine groups of the chelating resin according to the invention containing functional groups of structural element (I) is 1.0 to 1.5.

The chelating resins according to the invention containing functional groups of structural element (I) are of excellent suitability for the recovery and purification of metals, preferably of heavy metals, noble metals and rare earths.

In a particularly preferred embodiment of the invention, the chelating resins according to the invention containing functional groups of structural element (I) are suitable for the adsorption of rare earths selected from the group: scandium, lanthanum, yttrium, cerium, praseodymium, neodymium, promethium, samarium, europium, gadolinium, terbium, dysprosium, holmium, erbium, thulium, ytterbium and lutetium. In a further embodiment of the invention, the chelating resins according to the invention containing functional groups of structural element (I) are suitable for the adsorption of iron, vanadium, copper, zinc, aluminum, cobalt, nickel, manganese, magnesium, calcium, lead, cadmium, uranium, mercury, elements of the platinum group, and gold or silver.

Very particularly preferably, the chelating resins according to the invention containing functional groups of structural element (I) are suitable for the adsorption of zinc, iron, vanadium, aluminum, tungsten, manganese, magnesium, calcium, cobalt and nickel. Even further preferably, the chelating resins according to the invention containing functional groups of structural element (I) are used for the adsorption of zinc, cobalt and nickel.

The adsorption is particularly preferably effected from concentrated nickel and cobalt concentrate solutions for the purification of battery chemicals.

In a further preferred embodiment of the invention, the chelating resins according to the invention are used for the purification of inorganic acids.

In a further preferred embodiment, the chelating resins according to the invention containing functional groups of structural element (I) are suitable for the removal of alkaline earth metals, for example calcium, magnesium, barium or strontium, from aqueous brines, such as those used for example in chloralkali electrolysis.

In a further preferred embodiment, the chelating resins according to the invention containing functional groups of structural element (I) are suitable for the adsorption and desorption of iron(III) cations. It has been found that iron (III) cations can be desorbed again in a large amount from the chelating resins according to the invention containing functional groups of structural element (I) by way of acids.

In a further preferred embodiment of the invention, the chelating resins according to the invention containing functional groups of structural element (I) are suitable in a process for preparing and purifying silicon, preferably silicon having a purity of greater than 99.99%.

Furthermore, the chelating resins according to the invention may preferably be used for the removal of metals from water for the purposes of water purification.

The chelating resins according to the invention provide novel resins having good adsorption properties for metals, particularly for the adsorption of zinc ions.

Determination of the Amount of Basic Groups 100 ml of the aminomethylated polymer is agitated down in the tamping volumeter and subsequently washed with demineralized water into a glass column. 1000 ml of 2% by weight sodium hydroxide solution is filtered through over 1 hour and 40 minutes. Demineralized water is then filtered through until 100 ml of eluate with added phenolphthalein has a consumption of 0.1 N (0.1 normal) hydrochloric acid of at most 0.05 ml.

50 ml of this resin is admixed in a beaker with 50 ml of demineralized water and 100 ml of 1 N hydrochloric acid. The suspension is stirred for 30 minutes and then transferred into a glass column. The liquid is drained off. A further 100 ml of 1 N hydrochloric acid is filtered through the resin over 20 minutes. 200 ml of methanol is then filtered through. All eluates are collected and combined and titrated with 1 N sodium hydroxide solution against methyl orange.

The amount of aminomethyl groups in 1 liter of aminomethylated resin is calculated according to the following formula: $(200-V)\cdot 20=$mol of aminomethyl groups per liter of resin, where V is the volume of the 1 N sodium hydroxide solution consumed in the titration.

The molar amount of the basic groups corresponds to the molar amount of the aminomethyl groups in the chelating resin.

Determination of Total Zn Capacity 50 ml of the resin is agitated down in the tamping volumeter and subsequently washed with demineralized water into a glass column. 150 ml of 5% by weight sulfuric acid is then applied to the resin by means of a dropping funnel. The acid is subsequently displaced from the filter with 250 ml of demineralized water. 500 ml of zinc acetate solution (15 g of $Zn(CH_3COO)_2$ is dissolved in 950 ml of demineralized water, adjusted to a pH=5 with conc. acetic acid and made up to 1000 ml with demineralized water) is then applied to the resin and rinsed with 250 ml of demineralized water. The adsorbed zinc is eluted with 250 ml of 5% by weight sulfuric acid. Rinsing is performed with 200 ml of demineralized water. The collected eluate is collected in a 500 ml volumetric flask and, if necessary, made up to the mark with demineralized water. The Zn concentration is determined from the 500 ml of acid eluate by means of ICP-OES and converted to the total Zn capacity.

EXAMPLES

Example 1

1a) Preparation of the Monodisperse, Macroporous Polymer Based on Styrene, Divinylbenzene and Ethylstyrene A 10 l glass reactor is initially charged with 3000 g of demineralized water, and a solution of 10 g of gelatin, 16 g of disodium hydrogenphosphate dodecahydrate and 0.73 g of resorcinol in 320 g of deionized water is added and mixed in. The temperature of the mixture is adjusted to 25 °C. Subsequently, with stirring, a mixture of 3200 g of microencapsulated monomer droplets having a narrow particle size distribution, composed of 3.1% by weight of divinylbenzene and 0.6% by weight of ethylstyrene (used in the form of a commercial isomer mixture of divinylbenzene and ethylstyrene with 80% divinylbenzene), 0.4% by weight of dibenzoyl peroxide, 58.4% by weight of styrene and 37.5% by weight of isododecane (technical isomer mixture having a high proportion of pentamethylheptane) is added, the microcapsule consisting of a formaldehyde-hardened complex coacervate composed of gelatin and a copolymer of acrylamide and acrylic acid, and 3200 g of aqueous phase having a pH of 12 is added.

The mixture is stirred and polymerized to completion by increasing the temperature in accordance with a temperature program commencing at 25 °C and ending at 95 °C. The mixture is cooled, washed through a 32 μm sieve and then dried at 80 °C under reduced pressure.

This gives 1893 g of a polymer having a monodisperse particle size distribution.

1b) Production of an Amidomethylated Polymer 1779 g of 1,2-dichloroethane, 588.5 g of phthalimide and 340.3 g of 36% by weight formalin are initially charged at room temperature. The pH of the suspension is adjusted to 5.5 to 6 with sodium hydroxide solution. The water is then removed by distillation. 43.2 g of sulfuric acid (98% by weight) is then metered in. The water formed is removed by distillation. The mixture is cooled. At 30 °C, 157.7 g of 65% oleum and then 422.8 g of monodisperse polymer prepared in accordance with process step 1a) are metered in. The suspension is heated to 65 °C and stirred at this temperature for a further 6.5 hours. The reaction liquid is drawn off, demineralized water is metered in and residual amounts of 1,2-dichloroethane are removed by distillation.

Yield of amidomethylated polymer: 1900 ml

1c) Production of an Aminomethylated Polymer

Into 1884 ml of amidomethylated polymer from 1b) is metered 904.3 g of 50% by weight sodium hydroxide solution and 1680 ml of demineralized water at room temperature. The suspension is heated to 180 °C over 2 hours and stirred at this temperature for 8 hours. The polymer obtained is washed with demineralized water.

Yield of aminomethylated polymer: 1760 ml

Determination of the amount of basic groups: 2.05 mol/liter of resin

1d) Reaction of Aminomethylated Resin with Phenylphosphinic Acid

A reactor is initially charged with 100 ml of demineralized water and 100 ml of aminomethylated polymer (0.21 mol of aminomethyl groups) from Example 1. 76.5 g of phenylphosphinic acid (99%, 0.53 mol) is then added in portions and then stirred for 15 min. 164 g of 98% sulfuric acid (1.64 mol) is added dropwise over the course of 2 hours and the suspension is then heated to 95 °C 59.8 g of 36% formalin solution (0.72 mol) is added at this temperature over the course of 1 hour and then stirred at 95 °C for 4 h. After cooling, the resin is washed to neutrality on a sieve with demineralized water, transferred into a glass column and converted into the Na form with 4% sodium hydroxide solution.

Yield of resin in Na form: 260 ml

Composition by elemental analysis (dried resin):

Nitrogen=3.4%

Phosphorus=11%

Substitution on the nitrogen (from elemental analysis, P:N ratio) 1.47

Total Zn capacity (H form): 36.7 g/l

Example 2

Reaction of Aminomethylated Resin with Ethylphosphinic Acid

A reactor is initially charged with 100 ml of demineralized water and 100 ml of aminomethylated polymer (0.21 mol of aminomethyl groups) from Example 1c). 55.2 g of ethylphosphinic acid (91%, 0.53 mol) is then added in portions and then stirred for 15 min. 164 g of 98% sulfuric acid (1.64 mol) is added dropwise over the course of 2 hours and the suspension is then heated to 95 °C 59.8 g of 36% formalin solution (0.72 mol) is added at this temperature over the course of 1 hour and then stirred at 95 °C for 4 h. After cooling, the resin is washed to neutrality on a sieve with demineralized water, transferred into a glass column and converted into the Na form with 4% sodium hydroxide solution.

Yield of resin in Na form: 216 ml

Composition by elemental analysis (dried resin):

Nitrogen=4.2%

Phosphorus=11%

Substitution on the nitrogen (from elemental analysis, P:N ratio) 1.19

Total Zn capacity (H form): 32.8 g/A

Example 3

Reaction of Aminomethylated Resin with 2-Methylpentylphosphinic Acid

A reactor is initially charged with 40 ml of demineralized water and 40 ml of aminomethylated polymer (0.08 mol of aminomethyl groups) from Example 1c). 34 g of 2-methylpentylphosphinic acid (94%, 0.21 mol) is then added in portions and then stirred for 15 min. 66 g of 98% sulfuric acid (0.66 mol) is added dropwise over the course of 2 hours and the suspension is then heated to 95 °C. 23.9 g of 36% formalin solution (0.29 mol) is added at this temperature over the course of 1 hour and then stirred at 95 °C for 4 h. After cooling, the resin is washed to neutrality on a sieve with demineralized water, transferred into a glass column and converted into the Na form with 4% sodium hydroxide solution.

Yield of resin in Na form: 91 ml

Composition by elemental analysis (dried resin):

Nitrogen=4.0%

Phosphorus=9.1%

Substitution on the nitrogen (from elemental analysis, P:N ratio) 1.03

Total Zn capacity (H form): 21.8 g/l

Comparative Example in Relation to DE-A 2848289

Reaction of Aminomethylated Resin with Phosphinic Acid

A reactor is initially charged with 50 ml of demineralized water and 100 ml of aminomethylated polymer (0.21 mol of aminomethyl groups) from Example 1c). 71.4 g of phosphinic acid (50% in water, 0.54 mol) is then added in portions and then stirred for 15 min. 167 g of 98% sulfuric acid (1.66 mol) is added dropwise over the course of 2 hours and the suspension is then heated to 95 °C. 60.7 g of 36% formalin solution (0.73 mol) is added at this temperature over the course of 1 hour and then stirred at 95 °C for 4 h. After cooling, the resin is washed to neutrality on a sieve with demineralized water, transferred into a glass column and converted into the Na form with 4% sodium hydroxide solution.

Yield of resin in Na form: 130 ml

Composition by elemental analysis (dried resin):

Nitrogen=6.7%

Phosphorus=10%

Substitution on the nitrogen (from elemental analysis, P:N ratio) 0.68

Total Zn capacity (H form): 15 g/l

Result

TABLE 1

| Example | Radical $R^4$ | Total Zn capacity (H-form) [g/l] |
|---|---|---|
| 1 | Phenyl | 36.7 |
| 2 | Ethyl | 32.8 |
| 3 | 2-Methylpentyl | 21.8 |
| Comparative example | $CH_2OH$ | 15.0 |

$R^3$ in the examples=hydrogen.

Examples 1 to 3 show that the claimed compounds surprisingly have a significantly higher total Zn capacity than the resin known from DE-A 2848289 and prepared with phosphinic acid.

What is claimed is:

1. Chelating resins containing functional groups of structural element (I)

(I)

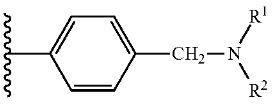

(I)

in which  is the polystyrene copolymer skeleton and $R^1$ and $R^2$ are independently hydrogen or $—CH_2—PO(OR^3)R^4$, where $R^1$ and $R^2$ may not both simultaneously be hydrogen and $R^3$=hydrogen or C1-C15 alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, each of which may be mono- or polysubstituted by $C_1$-$C_8$ alkyl.

2. The chelating resins according to claim 1, wherein $R^4$=$C_1$-$C_{15}$ alkyl or $C_6$-$C_{24}$ aryl, which may be mono- or polysubstituted by $C_1$-$C_8$ alkyl.

3. The chelating resins according to claim 1, wherein $R^4$=$C_1$-$C_6$ alkyl or phenyl, which may be mono-, di- or trisubstituted by methyl or ethyl.

4. The chelating resins according to claim 1, wherein $R^4$=ethyl, 2,4,4-trimethylpentyl, 2-methylpentyl, benzyl and phenyl.

5. The chelating resins according to claim 1, wherein $R^1$ and $R^2$=$—CH_2—PO(OR^3)R^4$.

6. The chelating resins according to claim 1, wherein $R^3$=hydrogen or $C_1$-$C_6$ alkyl.

7. A process for preparing the chelating resins containing functional groups of structural element (I)

(I)

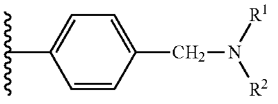

in which  is a polystyrene copolymer skeleton and $R^1$ and $R^2$ are independently hydrogen or $—CH_2—PO(OR^3)R^4$, where $R^1$ and $R^2$ may not both simultaneously be hydrogen and $R^3$=hydrogen or C1-C15 alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, each of which may be mono- or polysubstituted by $C_1$-$C_8$ alkyl comprising the steps of:

a) reacting monomer droplets composed of at least one monovinylaromatic compound and at least one polyvinylaromatic compound and at least one initiator, thereby forming a polymer, b) phthalimidomethylating the polymer from step a), thereby forming a phthalimidomethylated polymer, c) reacting the phthalimidomethylated polymer from step b) with at least one base or at least one acid, thereby forming a aminomethylated polymer, and d) functionalizing the aminomethylated polymer from step c) by reaction with formaldehyde or derivatives thereof in the presence of at least one suspension medium and at least one acid and at least one compound of formula (II) or salts thereof

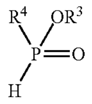

(II)

where $R^3$=hydrogen or C1-C15 alkyl and $R^4$ is $C_1$-$C_{15}$ alkyl, $C_6$-$C_{24}$ aryl, $C_7$-$C_{15}$ arylalkyl or $C_2$-$C_{10}$ alkenyl, each of which may be mono- or polysubstituted by $C_1$-$C_8$ alkyl.

8. The process according to claim 7, wherein the formaldehyde or derivatives thereof used in process step d) is formalin.

9. The process according to claim 7, wherein, in process step d), the formaldehyde or derivatives thereof and the aminomethylated polymers from step c) are used in a molar ratio of 2 to 8 based on the molar amount of the aminomethyl groups.

10. The process for preparing the chelating resins as claimed in claim 7, wherein, in process step d), 2 to 12 mol of inorganic acid is used per mole of the aminomethyl groups of the aminomethylated polymer.

11. The process for preparing the chelating resins as claimed in claims 7, wherein, in process step d), the molar ratio of the compounds of formula (II) used to the amount of the aminomethyl groups in the aminomethylated polymer is 1 to 4.

12. A process for adsorption of metals comprising adding a chelating resin as claimed in claim 1 to a solution containing metals.

13. The process as claimed in claim 12, wherein the metals are selected from the group consisting of iron, vanadium, zinc, aluminum, cobalt, tungsten, copper, nickel, manganese, magnesium, calcium, lead, cadmium, uranium, mercury, scandium, lanthanum, yttrium, cerium, praseodymium, neodymium, promethium, samarium, europium, gadolinium, terbium, dysprosium, holmium, erbium, thulium, ytterbium, lutetium, elements of the platinum group, gold, and silver.

14. The process as claimed in claim 13, wherein the metals are selected from the group consisting of zinc, cobalt and nickel.

15. The chelating resins according to claim 1, wherein the resin is added to a reaction for the preparation and purification of silicon.

* * * * *